United States Patent

Masaru et al.

Patent Number: 5,598,245
Date of Patent: Jan. 28, 1997

[54] FLANGE BACK MECHANISM FOR PHOTOGRAPHIC CAMERA

[75] Inventors: Yamamoto Masaru; Atsuta Toshikatsu; Koshimizu Yoshinori; Kitamura Nobuo; Ishikawa Tadaaki; Yasuhara Shin, all of Tokyo, Japan

[73] Assignee: Kyocera Corporation, Kyoto, Japan

[21] Appl. No.: 260,529

[22] Filed: Jun. 16, 1994

Related U.S. Application Data

[63] Continuation-in-part of Ser. No. 226,004, Apr. 7, 1994.

[30] Foreign Application Priority Data

Aug. 11, 1993 [JP] Japan ................................. 5-217961

[51] Int. Cl.⁶ ............................................. G03B 17/02
[52] U.S. Cl. .................................... 396/440; 396/535
[58] Field of Search ......................... 354/70, 158, 286, 354/288, 295, 195.1, 203, 400

[56] References Cited

U.S. PATENT DOCUMENTS 4,241,987 12/1980 Goldberg ........................... 354/195
4,547,053 10/1985 Tobler ............................... 354/187

FOREIGN PATENT DOCUMENTS

| 294734 | 10/1940 | Japan . |
| 2-24640 | 1/1990 | Japan . |
| 5-173225 | 7/1993 | Japan . |
| 6-51190 | 2/1994 | Japan . |
| 6-51189 | 2/1994 | Japan . |

Primary Examiner—David M. Gray
Assistant Examiner—Matthew Miller
Attorney, Agent, or Firm—Loeb & Loeb LLP

[57] ABSTRACT

The invention concerns a flange back mechanism for a single-lens reflex camera which has a structure permitting an image-forming surface to be moved in a distance-reducing direction further from a reference flange back position commonly defined for various interchangeable lens, to provide an ultra infinity position. By merely placing a distance ring of an interchangeable lens in the vicinity of infinity, AF response from the closest distance to infinity becomes possible.

6 Claims, 5 Drawing Sheets

FLANGE BACK MECHANISM FOR PHOTOGRAPHIC CAMERA

CROSS REFERENCE TO CO-PENDING U.S. APPLICATION

This is a continuation-in-part application of co-pending U.S. application having Ser. No. 08/226,004 filed on Apr. 7, 1994.

BACKGROUND OF THE INVENTION a) Field of the Invention

The present invention relates to a flange back mechanism for a photographic camera, particularly applicable to a lens-interchangeable-type single-lens reflex camera wherein the focus adjustment is performed by adjusting the back focus.

b) Description of Related Art

In typical single-lens reflex cameras, the focus adjustment with respect to each distance to a subject is effected by a distance ring of the lens.

Single-lens reflex cameras in which the distance ring is automatically driven to a focusing position by a motor incorporated in the body or a motor incorporated in the lens have been put to commercial use as AF single-lens reflex cameras, but these AF single-lens reflex cameras require AF lenses, and thus it has been impossible to perform the autofocus function with conventional MF lenses.

In addition, conventional single-lens reflex cameras adopt a fixed-type flange back mechanism, so that a closer shot than the shortest photographing distance peculiar to the lens has been impossible.

To overcome this problem, one of the present inventors has proposed single-lens reflex cameras in which a camera body is comprised of a body-front fixed section, which mainly consists of a driving power supply, a driving mechanism, a camera-holding grip having a release button, and the like, using as a reference a lens mount allowing a conventional lens to be mounted and interchanged, and a back movable section which mainly consists of a distance-measuring mechanism including a distance-measuring element, a film-exposing mechanism, a viewfinder, and the like, whereby focus adjustment is made by an amount of movement of the back movable section relative to the body-front fixed section (U.S. patent applicatoin Ser. No. 08/226,004).

According to the techniques disclosed therein, it is possible to move the shortest photographing distance of conventional lenses to a further closer photographing side, and to achieve the autofocus function with an automatic drive system.

In this case, the position of a flange back, which serves as a reference which is common to various types of lenses that are mounted on the camera, is very important. This position is used as a reference position of autofocus adjustment with the lens be set at infinity.

However, since the conventional MF lens is not provided with a locking mechanism such as the one provided in a lens exclusively used for AF, the conventional MF lens can be moved undesirebly even in a case where the back-drive type system is set to an autofocus mode. That is to say, AF response with the MF lens has been insuffcient if the lens is not set in the position of infinity or the lens is offset slightly therefrom even though the photographer might have thought that it has been set at that position.

Accordingly, there has been the problem that the photographer must pay heed to the position of the distance ring of the lens at all times so that the distance ring of the lens is surely set at the position of infinity.

SUMMARY OF THE INVENTION

Accordingly, an objective of the present invention is to provide an improved flange back mechanism for a phtographing camera, e.g. a single-lens reflex camera, which does not require the photgraper to pay the heed to the position of the distance ring of the lens when the autofocus function is perforemd with the conventional MF lens.

To attain the above-noted and other objectives, the present invention provides a structure allowing movement of an image-forming surface in a distance-reducing direction further from a reference flange back position to establish a ultra infinity position for the lens to be mounted.

In more detail, the present invention provides a flange back mechanism for a photographing camera, which includes: a first section having a lens mount adapted to receive a camera lens thereon, the lens defining an optical axis and a reference flange back position on the optical axis, the reference flange back position being a focal point of the lens when the lens is set at infinity; and a second section coupled to the first section and holding a film on which an image is to be formed, wherein the second section is movable relative to the first section along the optical axis so that the film on the optical axis is located at a first position closer to the lens relative to the reference flange back position. preferably, the flange back mechanism further includes: first means for controllingly moving the second section relative to the first section along the optical axis to move the film within a range from the first position to a second position opposite from the first position with respect to the reference flange back position, whereby a focused image is formed on the film even when an autofocus mode is set for the camera but a distance ring of the lens is offset from an infinity position. The flange back mechanism may further includes: second means for moving the second section relative to the first section so that the film is fixedly located at the reference flange back position when a manual focus mode is set for the camera.

In accordance with the above-described structure, since the image-forming surface, i.e. the film on the second section is movable to the position closer to lens relative to the reference flange back position peculiar to a lens to provide an ultra-infinity, the operation of setting the distance ring of the photographic lens to the position of infinity, i.e., a condition of AF photographing, is facilitated. That is, by simply placing the photographic lens in the vicinity of infinity, AF response from the closest distance to infinity becomes possible.

This eliminates the trouble of AF failing to operate fully due to the offsetting of the distance ring of the lens, as well as the offsetting of the position of infinity while the camera is being carried. Hence, the photographer's uneasiness is overcome.

DETAILED DESCRIPTION OF THE PREFERRED EMBODIMENTS

Figure 1:
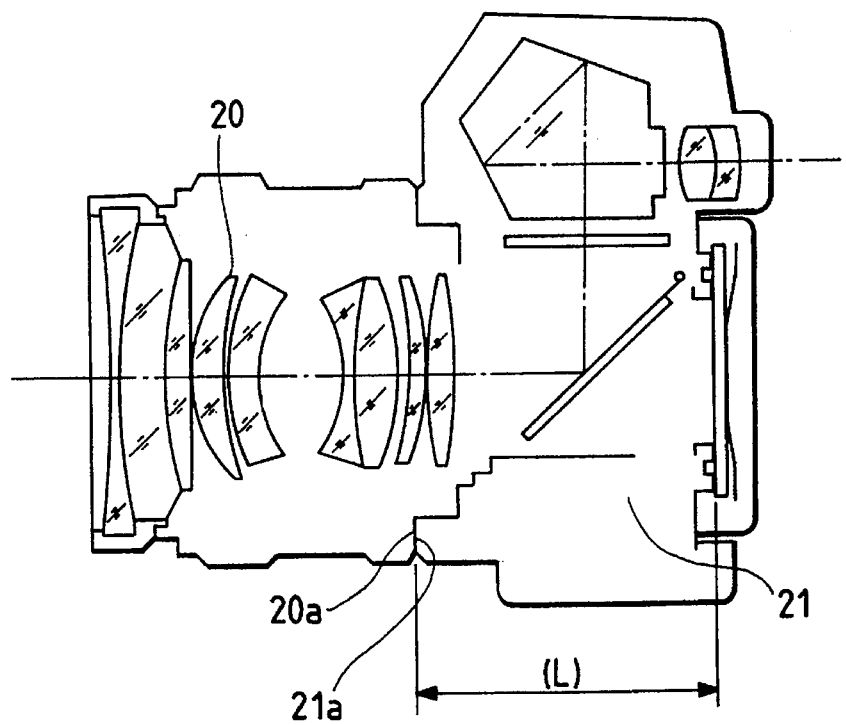
FIG. 1 is a cross-sectional view of a general camera for explaining a flange back.

Referring now to the drawings, a detailed description will be given of the present invention.

First, referring to FIGS. 1 to 5, a description will be given of the basic principle of the present invention.

FIG. 1 is a cross-sectional view of a general camera for explaining a flange back distance L. The flange back distance L is defined between an image-forming position and a reference position at which a lens mount surface 20a of an interchangeable lens assembly 20 and a lens mount surface 21a of the camera body contact with each other. The flange back distance L is set by each manufacturer so that an image of the subject at infinity is formed on an image-forming surface at the image-forming position when the position of the distance ring of the interchangeable lens is at infinity. Generally, the flange back distance L is standerized to thereby enable the application of the various interchangeable-lenses to various camera bodies. For example, the flange back distance L is commonly set at 45.5 mm for all the interchangeable lenses.

Figure 2:
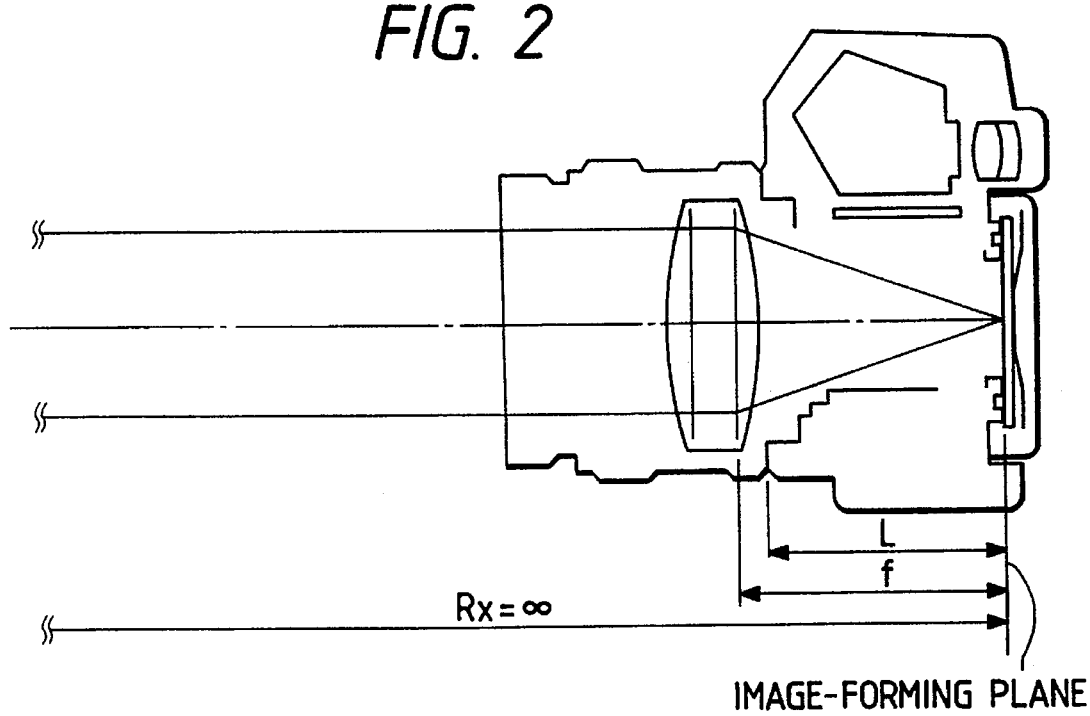
FIG. 2 is a cross-sectional view of a camera in which a lens assembly of an interchangeable lens in FIG. 1 is replaced by a single equivalent lens.
Figure 3:
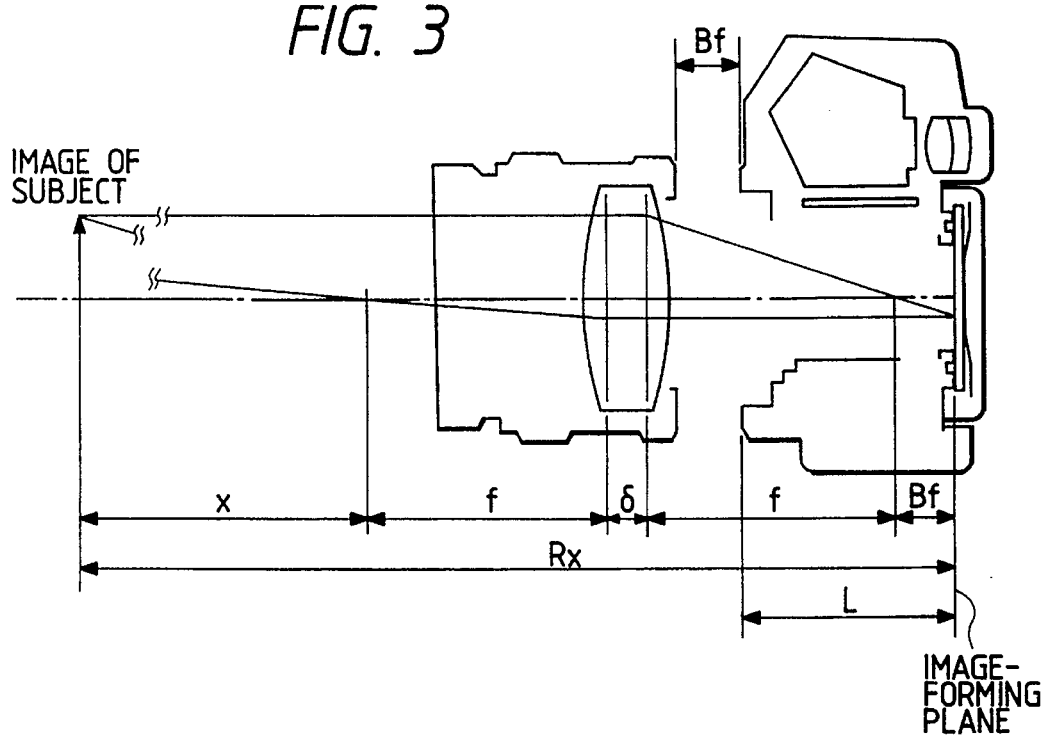
FIG. 3 is a cross-sectional view of a camera for explaining a formula for calculating the focal length and the photographic distance.

FIG. 2 is a cross-sectional view of a camera in which the lens assembly of the interchangeable lens in FIG. 1 is replaced by a single equivalent lens for simple explanation purpose, and wherein a forcal point of the lense exists on the image-foming surface, the character f designating a focal length. FIG. 3 is a cross-sectional view of a camera for explaining a formula which is for calculating the focal length and the photographic distance.

It is known that, assuming that the focal length is f, the distance between principal planes of the lens is δ, the amount of forward movement of the lens is Bf, and the photographing distance Rx, the focal length f and the photographing distance Rx can be calculated from the following formulae:

$$f^2 = x\, Bf(x) \quad (1)$$

$$Rx = 2f + \delta + x + Bf(x) \quad (2)$$

It can be appreciated that focusing at a finite distance is possible by setting the distance ring of the photographic lens to infinity and adjusting the distance Bf between the mounting surface of the lens and the mounting surface of the camera body, as shown in FIG. 3. That is, it can be seen that it suffices to render the flange back distance changeable from the reference flange back distance L by an amount of the adjustable distance Bf. In other words, the focusing operation can be achieved by moving the image forming surface backward from the position of the reference flange back distance L by the amount of the adjustable distance Bf if the lens mount surface 20a of the lens remains contacted with the lens mount surface 21a of the camera body. However, as noted above, since this focusing operation necesitates the the distance ring of the lens be surely held at the infinity position, a further improvement is incorporated in changing the flange back distance in the present invention.

Figure 4:
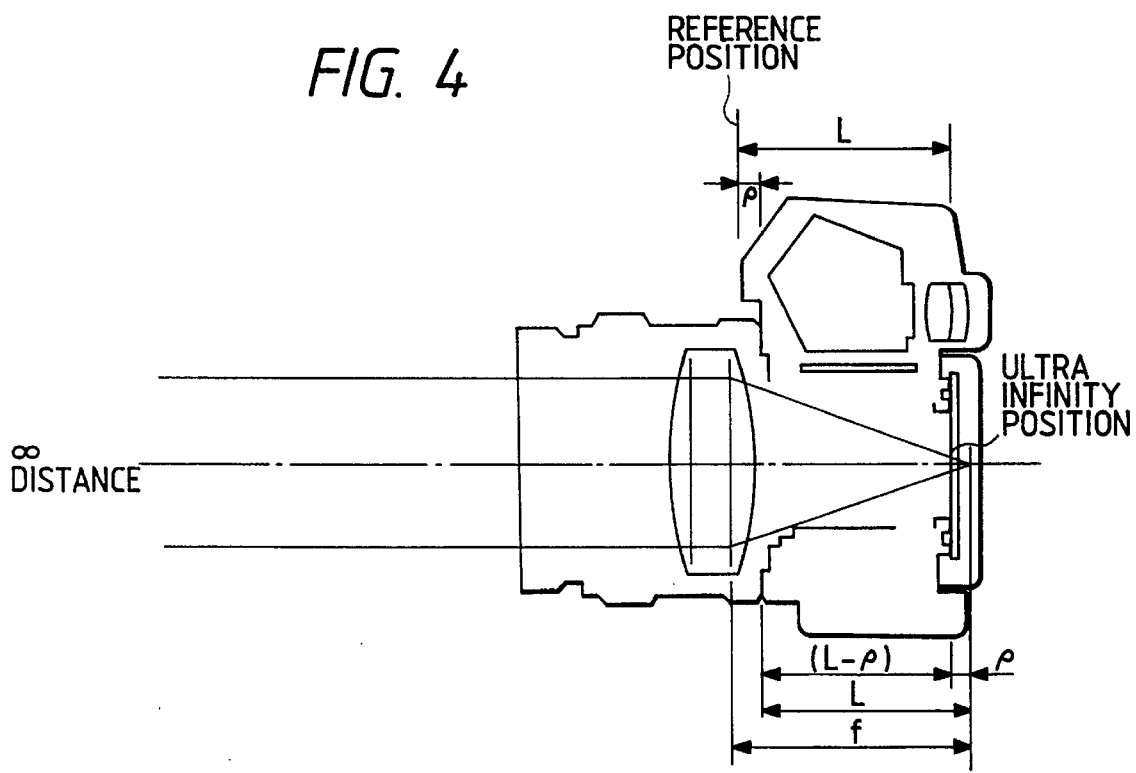
FIG. 4 is a cross-sectional view of a camera for explaining the basic principle for rendering the flange back changeable in the present invention.

FIG. 4 is a cross-sectional view of a camera for explaining the basic principle for rendering the flange back distance changeable in the present invention, wherein the shortest flange back distance is set to be shorter by an infinitesimal distance ρ than the reference flange back distance L so that the image-forming surface can be located at a position of ultra infinity.

Figure 5:
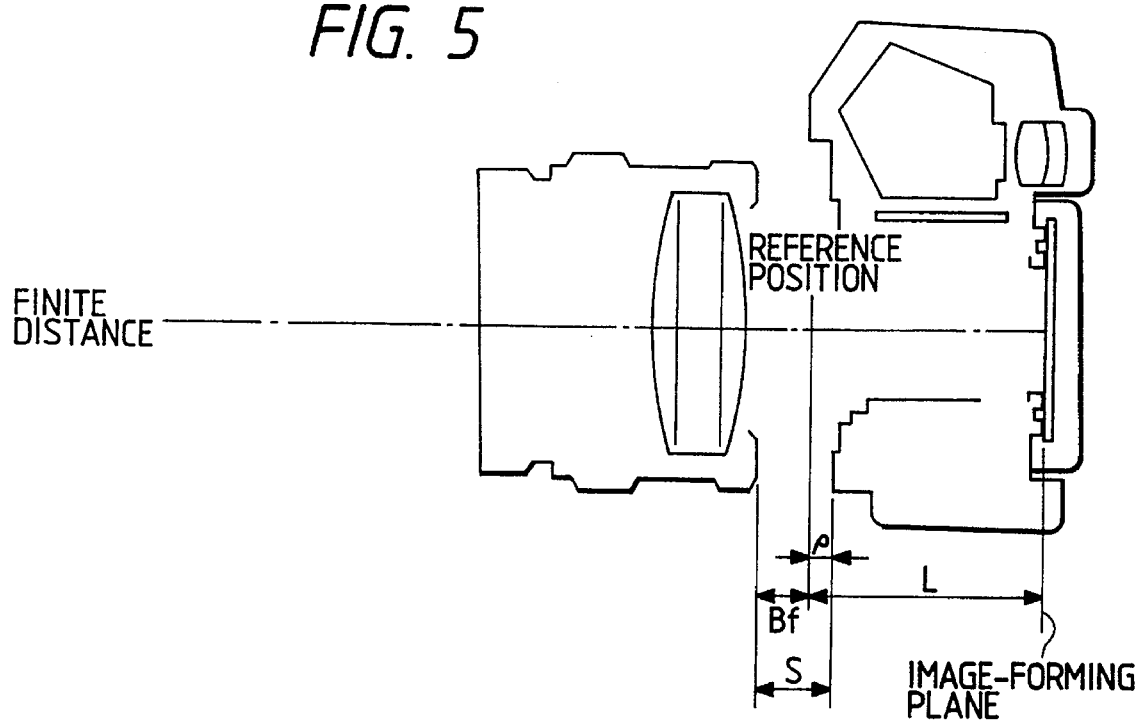
FIG. 5 is a cross-sectional view of the camera for explaining a changeable distance of forward movement on the basis of the basic principle in accordance with the present invention.

It can be seen that even if the position of infinity on the distance ring of the lens to be mounted is deviated so that the lens is moved forward by ρ, photographing of an infinite distance is possible through adjustment of the flange back distance by setting a variable forward-movement distance s to (Bf+ρ), as shown in FIG. 5. Thus, the object of the present invetion can be attained.

Figure 6:
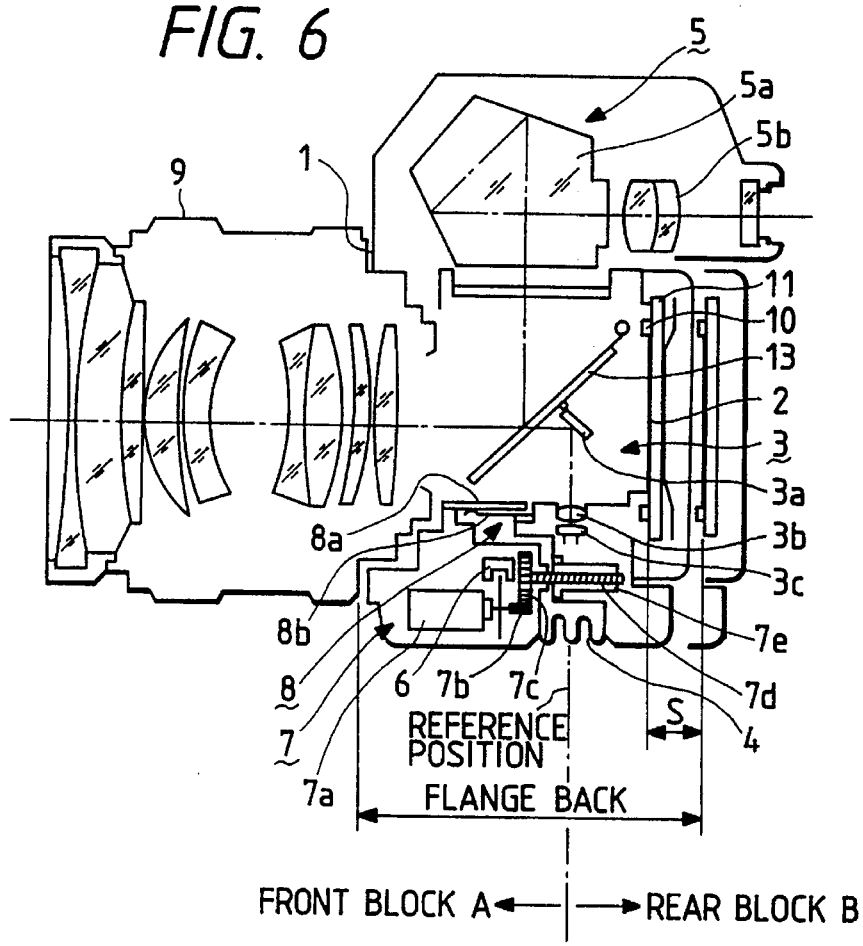
FIG. 6 is a schematic cross-sectional view of a camera illustrating an embodiment of a flange back mechanism of a single-lens reflex camera in accordance with the present invention

FIG. 6 is a schematic cross-sectional view of a camera illustrating an embodiment of a flange back mechanism for a single-lens reflex camera in accordance with the present invention.

A front block A of the camera body includes an interchangeable lens 9, a lens mount 1, an AF driving mechanism 7, and a grip having a release button (the release button and the grip are not shown in the drawing).

A rear block B of the camera body includes an up-down mirror 13, a viewfinder mechanism 5, an aperture 10, an exposure mechanism, a film-feeding mechanism, and a distance-measuring mechanism 3.

The light from an unillustrated subject passes through the interchangeable lens 9, and its optical path is bent 90 degrees upward by the up-down mirror 13. The light from the up-down mirror 13 is made incident upon the viewfinder mechanism 5, is bent by a pentaprism 5a in such a manner as to become parallel light with respect to a principal optical axis, and reaches an eyepiece 5b. Part of the subject light which has passed through the interchangeable lens 9 is also made incident upon an AF mirror 3a of the distance-measuring mechanism 3, its optical axis is bent downward, and that light reaches an AF sensor 3c by means of an AF lens 3b.

The AF driving mechanism 7 includes a flange-back driving motor 7a, an encoder 6 for detecting the number of revolutions of the motor 7a, gears 7b, 7c, a lead screw 7d, and a female screw 7e.

The output of the flange-back driving motor 7a whose rotational speed is reduced by means of the gears 7b and 7c is transmitted to the lead screw 7d. The lead screw 7d meshes with the female screw 7e provided in a base portion of the rear block B of the camera body. As the lead screw 7d is rotated, the distance in the direction of the optical axis between the front block A and the rear block B of the camera body changes. Consequently, it is possible to adjust the distance between the lens mount 1 and the aperture (opening) 10, i.e., the flange back distance.

The distance between the front block A and the rear block B of the camera body is changeable by the amount s (=Bf+ρ). That is to say, the front block A and the rear block B of the camera body are arrangmed so that with respect to the reference position (at the reference flange back distance L from the lens mount 1) the image-forming surface is moved by an amount of ρ in a distance further reducing direction and by Bf in a distance increasing direction. As noted above, the reference flange back distance L is defined by a distance between the lens mount 1 and the focal point of the lens 9 where the focus of the lens is set to the position of infinity.

Information which shows the positional relationship between the front block A and the rear block B of the camera body can be detected by a position detecting switch 8 which is a movable-position detecting means. A code pattern substrate 8a constituting the position detecting switch 8 is fixed to a base portion of the front block A of the camera body, while an end of its contact 8b is fixed to the base portion of the rear block B of the camera body. If the distance between the front and rear blocks A and B changes, the code pattern changes correspondingly, thereby making it possible to obtain a flange back (hereafter referred to as "FB") position detecting signal.

It should be noted that, as the position detecting switch 8, it is possible to use a sliding resistor or other similar method in addition to the code pattern.

As members for connecting the front block A and the rear block B of the camera body, an arrangement may be provided such that the front block A and the rear block B are respectively provided with rails and rollers (neither the rails nor the rollers are shown) to allow the rollers to be rolled on the rails, whereby the distance between the blocks can be changed smoothly with a minimum burden.

It should be noted that a bearing which undergoes linear movement or the like may be used as an alternative member thereof.

An unillustrated guide rod is provided on the front block A of the camera body at a position which is opposite from the position of the lead screw 7d with the up-down mirror 13 interposed therebetween. As a member for guiding the guide rod, an unillustrated guide hole is provided in the rear block B of the camera body. As the lead screw 7d rotates, the guide rod slides in the guide hole, and guides the rear block B of the camera body relative to the front block A of the camera body in cooperation with the lead screw 7d. Consequently, the rear block B of the camera body can be moved in such a manner that the optical axes of the two blocks will not be misaligned and in a state in which parallelism is maintained between the aperture plane and the lens mount plane. A bellows 4 is provided between ends of the blocks where a gap is produced due to the change in the positional relationship, thereby preventing the leakage of light.

Figure 7:
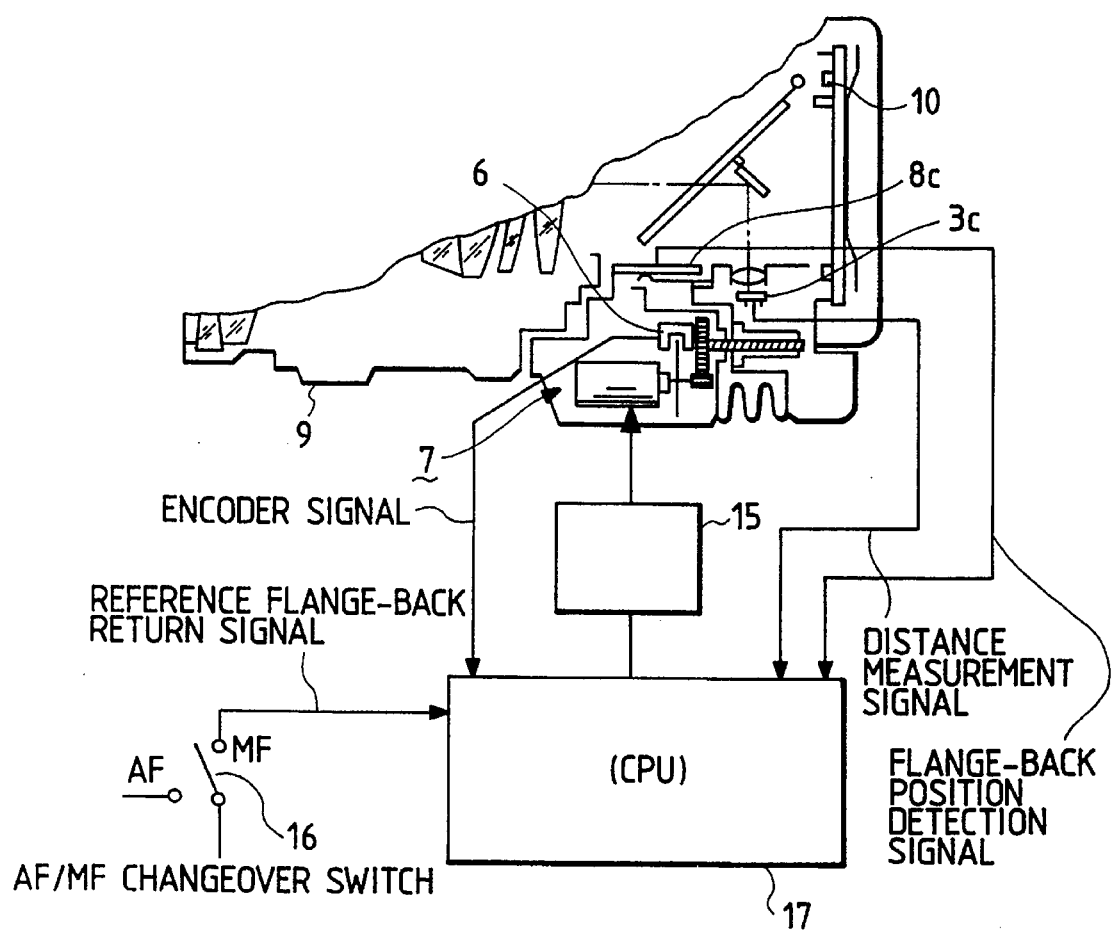
FIG. 7 is a circuit block diagram illustrating an example of a control circuit unit in accordance with the present invention.

FIG. 7 is a circuit block diagram illustrating an example of a control circuit unit in accordance with the present invention.

An FB position detection signal, an encoder signal, and a distance measurement signal (AF information) are outputted from the code pattern substrate 8a, the encoder 6, and the AF sensor 3c, respectively. An AF control circuit 17 receives as its input the FB position detection signal, the encoder signal, and the distance measurement signal, and drives an FB-driving motor drive circuit 15 on the basis of an instruction signal from an AF/MF changeover switch 16 and an on/off signal of an unillustrated power switch, so as to control the AF control mechanism.

Figure 8:
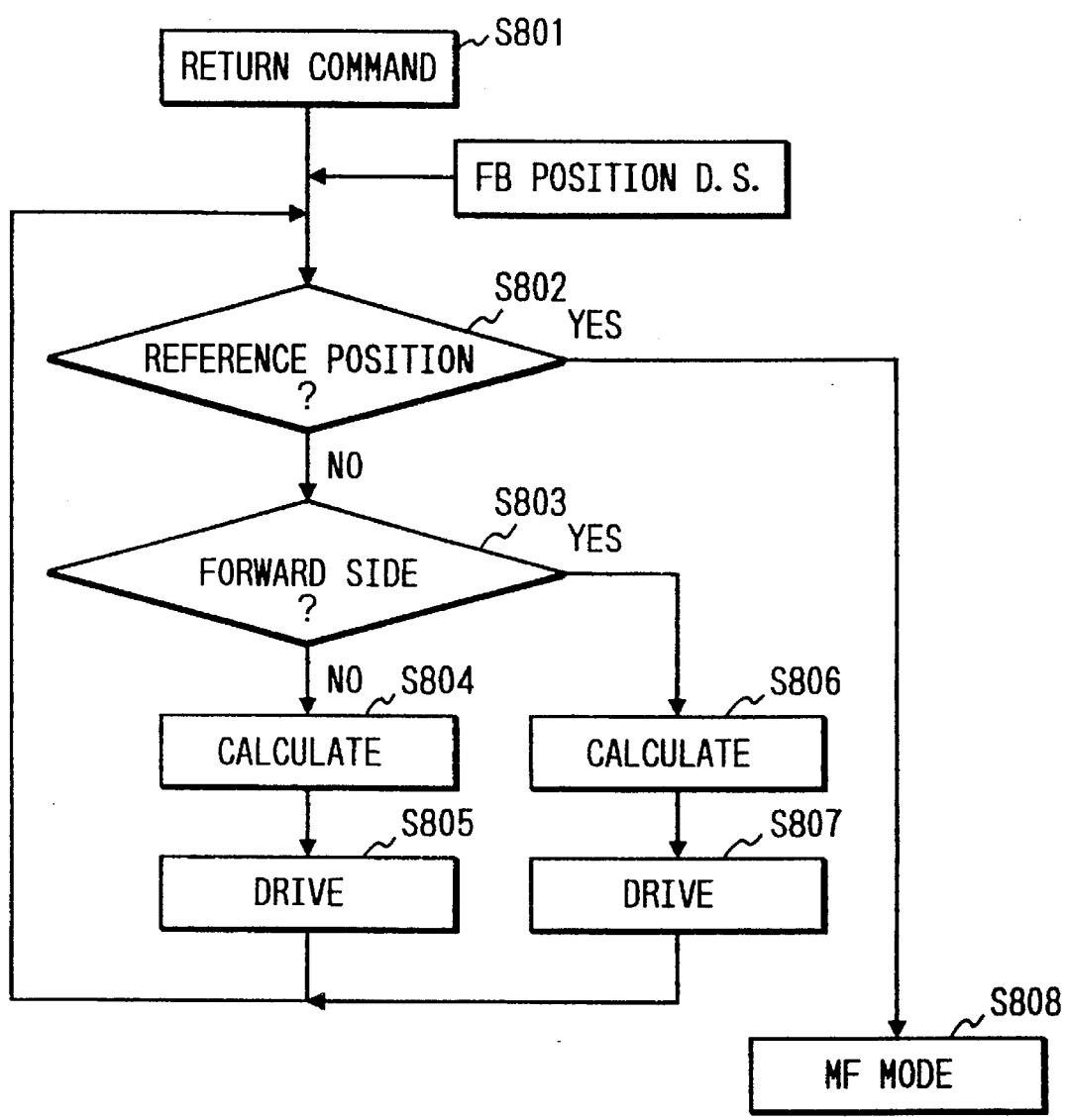
FIG. 8 is a flowchart for explaining the operation of the control circuit unit shown in FIG. 7.

FIG. 8 is a diagram of operation of the camera in accordance with the present invention, and is a flowchart for explaining the operation accompanying the changeover of the AF/MF changeover switch.

When the AF/MF changeover switch 16 is changed over to a MF mode (i.e. a manual focus mode), a reference flange-back return command is issued to the AF control circuit 17 (S801). The AF control circuit 17 is capable of ascertaining the distance of the rear block with respect to the front block A on the basis of the FB position detection signal from the code pattern 8a. The AF control circuit 17 determines whether or not the present position of the FB is at the reference position L (S802). If the present position is at the reference position L, the setting of the MF photographing mode is completed (S808). If the present position is not at the reference position L, a determination is made as to whether or not the position is on the forward side (ultra infinity side) of the reference position (S803).

If the position is offset toward the rearward side, a calculation is made as to to what extent the position is to be moved forward up to the reference position (S804). The FB-driving motor drive circuit 15 is then controlled, and the rear block B is moved to the reference position by driving the motor 7 (S805). Meanwhile, if the position is offset toward the forward side, a calculation is made as to to what extend the position is to be moved rearward up to the reference position (S806). The FB-driving motor drive circuit 15 is then controlled, and the rear block B is moved to the reference position by driving the motor 7 (S807). Accordingly, in a case where the distance ring of the lens is focused through manual adjustment, the flange back distance is automatically set to L, i.e., the reference position.

In addition, in a case where the AF/MF changeover switch 16 is in the AF mode, the camera is set in a standby state.

In the above-described embodiment, a description has been given of a case in which the front block A of the camera body is provided with a grip, and the flange back is adjusted by moving the rear block B by using the block A as a reference. However, it is apparent that similar operation is obtained if the rear block B is provided with the grip, and the block A is made movable by using the rear block B as a reference. In addition, the AF driving mechanism may be provided in the rear block B correspondingly.

Furthermore, if an AF sensor plane and a viewfinder plane can be arranged to be interlocked in an optically conjugated positional relationship, the AF distance-measuring mechanism, the viewfinder mechanism and the like may not necessarily be mounted in the rear block.

Moreover, the present invention is also be applicable to a back-focus adustment type camera in which a body core including an image-forming surface is enclosed by an outer casing so that the body core is movable in a direction of an optical axis relative to the outer casing.

Yet further, although the present invention has been explained in connection with the single-lens relex camera, the present invention can also be applied to a viewfinder or compact camera, as long as it employs the bak-focus adjustment system.

As described above, in a single-lens reflex camera using a back-focus controlling system in accordance with the present invention, the flange back distance of the camera is set to be shorter than the reference flange back distance L which is commonly defined for various interchangeable camera to represent a reference position of an intended focal point when the distance ring of an interchangeable lens is set at the position of infinity.

The reference position for the flange back of already-proposed single-lens reflex cameras using the back-focus controlling system is set by allowing the relevant components to mechanically abut against each other in such a manner as to obtain a minimum distance. For this reason, in the event that the distance ring is offset by a slightest degree from the position of infinity, there is a problem in that photographing at the position of infinity becomes impossible in AF control, so that it has been necessary for the photographer to constantly pay heed to the position of the distance ring.

In accordance with the present invention, however, even if the distance ring is offset slightly from the position of infinity, the relevant block of the camera body can be moved in the direction in which the distance is further reduced, so that photographing at infinity unfailingly becomes possible insofar as the distance ring is offset within the extent that the relevant block of the camera body is movable in the distance-reducing direction. Hence, there is an advantage in that the uneasiness of the photographer can be overcome at the time of photographing.

Since the arrangement provided is such that the flange back is automatically set to the reference position when the focusing is carried out through an MF operation, no problem is presented in the manual focusing operation as well.

In addition, in case where a flange back mechanism for a single-lens reflex camera is-provided with movable-position detecting means for detecting the position of an aperture of a rear block with respect to a mounting surface for mounting the lens, precision distance measurement is made possible, and the position of the rear block which moves arbitrarily can be ascertained in advance, and a reference flange-back position, an ultra infinity position, and a position of a limit to responding movement toward the closest distance can be made controllable with precision.

Also, in accordance with the present invention, a focussed image can be formed on a film surface even if the distance ring of the lens is not set at infinity position. Therefore, a photographer can also enjoy a focusing operation manually with the distal ring of the lens while driving the flange back mechanism of the present invention so that the resultant image is accurately focussed on the film surface.

What is claimed is:

1. A flange back mechanism for a camera, comprising:

a first section having a lens mount adapted to receive a camera lens thereon, the lens defining an optical axis and a reference flange back position on the optical axis, the reference flange back position being a focal point of the lens when the lens is set at infinity; and a second section coupled to the first section and holding a film on which an image is to be formed, wherein the second section is movable relative to the first section along the optical axis so that the film on the optical axis is moveable toward and locatable at a first position closer to the lens relative to the reference flange back position.

2. The flange back mechanism according to claim 1, further comprising:

first means for controllingly moving the second section relative to the first section along the optical axis to move the film within a range from the first position to a second position opposite from the first position with respect to the reference flange back position, whereby a focused image is formed on the film even when an autofocus mode is set for the camera but a distance ring of the lens is offset from an infinity position.

3. The flange back mechanism according to claim 2, further comprising:

second means for moving the second section relative to the first section so that the film is fixedly located at the reference flange back position when a manual focus mode is set for the camera.

4. A flange back mechanism for a camera, comprising:

a first section having a lens mount adapted to receive a camera lens thereon, the lens defining an optical axis and a reference flange back position on the optical axis, the reference flange back position corresponding to a focal point of the lens when the lens is set at infinity, and a second section coupled to the first section and holding a film on which an image is to be formed, wherein the second section is movable relative to the first section along the optical axis so that the film on the optical axis is located at a first position closer to the lens relative to the reference flange back position, and wherein the lens is interchangeable.

5. The flange back mechanism according to claim 4, wherein the lens mount is formed with a flange surface which is kept in contact with a mating surface of the lens when the lens is mounted on the first section, the flange surface and the focal point defining a reference flange back distance which is a common value for available, interchangeable lenses.

6. The flange back mechanism according to claim 5, wherein the second section includes a distance finding device, an exposure device and a film feeding device.

* * * * *